Figure 1:
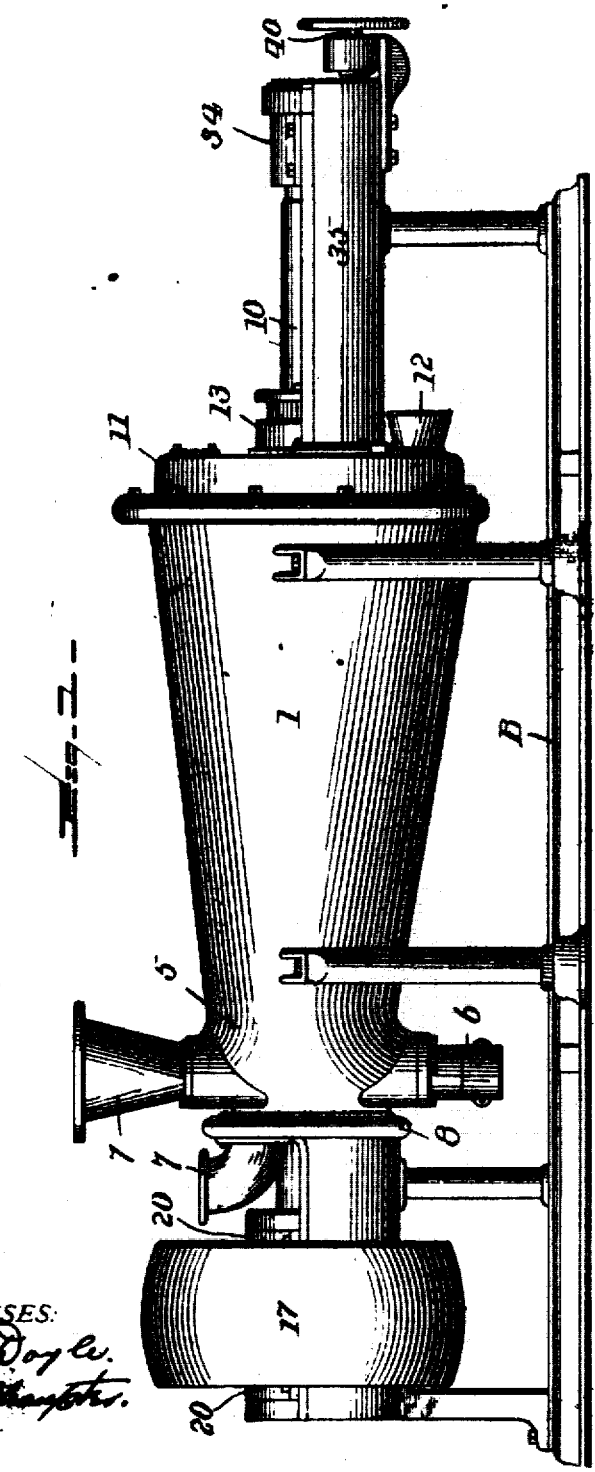

No. 818,039. PATENTED APR. 17, 1906.
M. A. MILLS.
REFINING ENGINE FOR PAPER PULP.
APPLICATION FILED APR. 23, 1901.

6 SHEETS—SHEET 2.

WITNESSES:

INVENTOR
Melvin A. Mills
By L. Deane
Attorneys

No. 818,039. PATENTED APR. 17, 1906.
M. A. MILLS.
REFINING ENGINE FOR PAPER PULP.
APPLICATION FILED APR. 23, 1901.

8 SHEETS—SHEET 3.

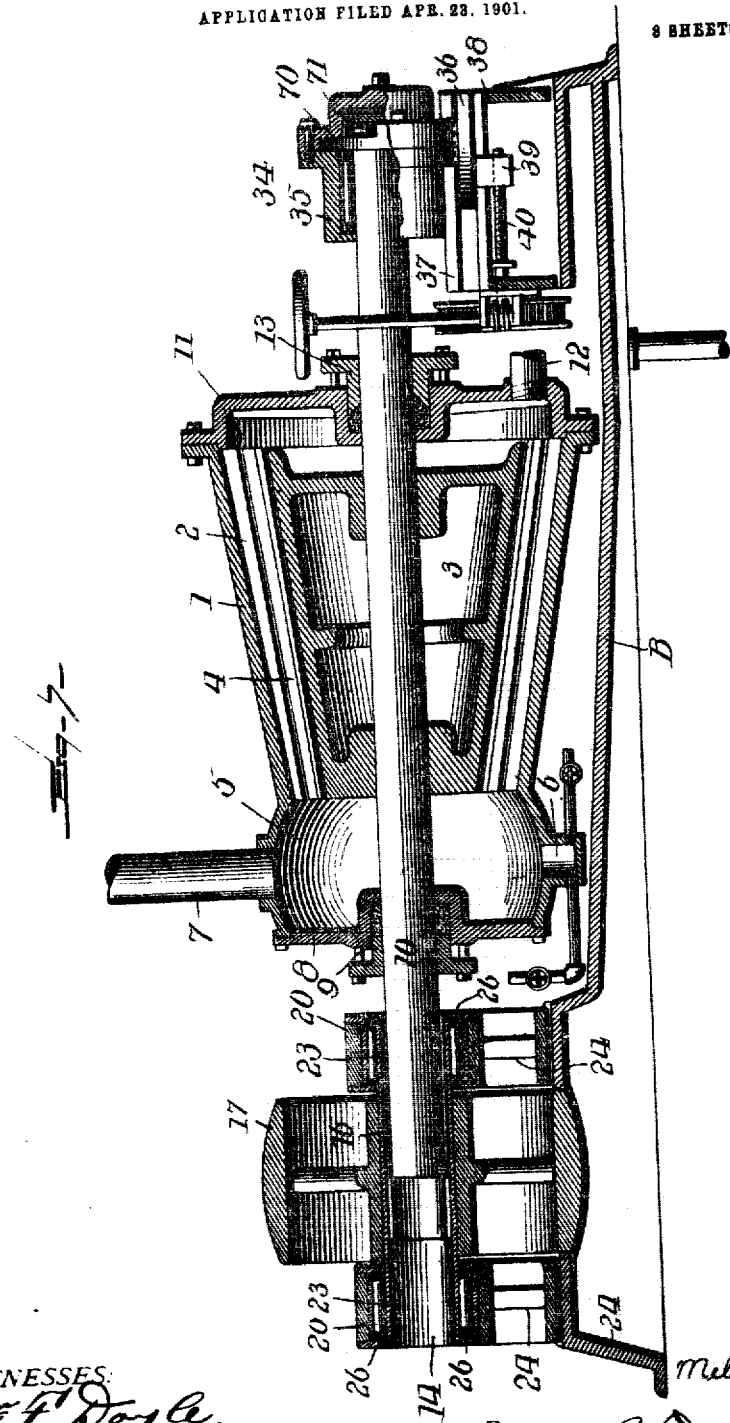

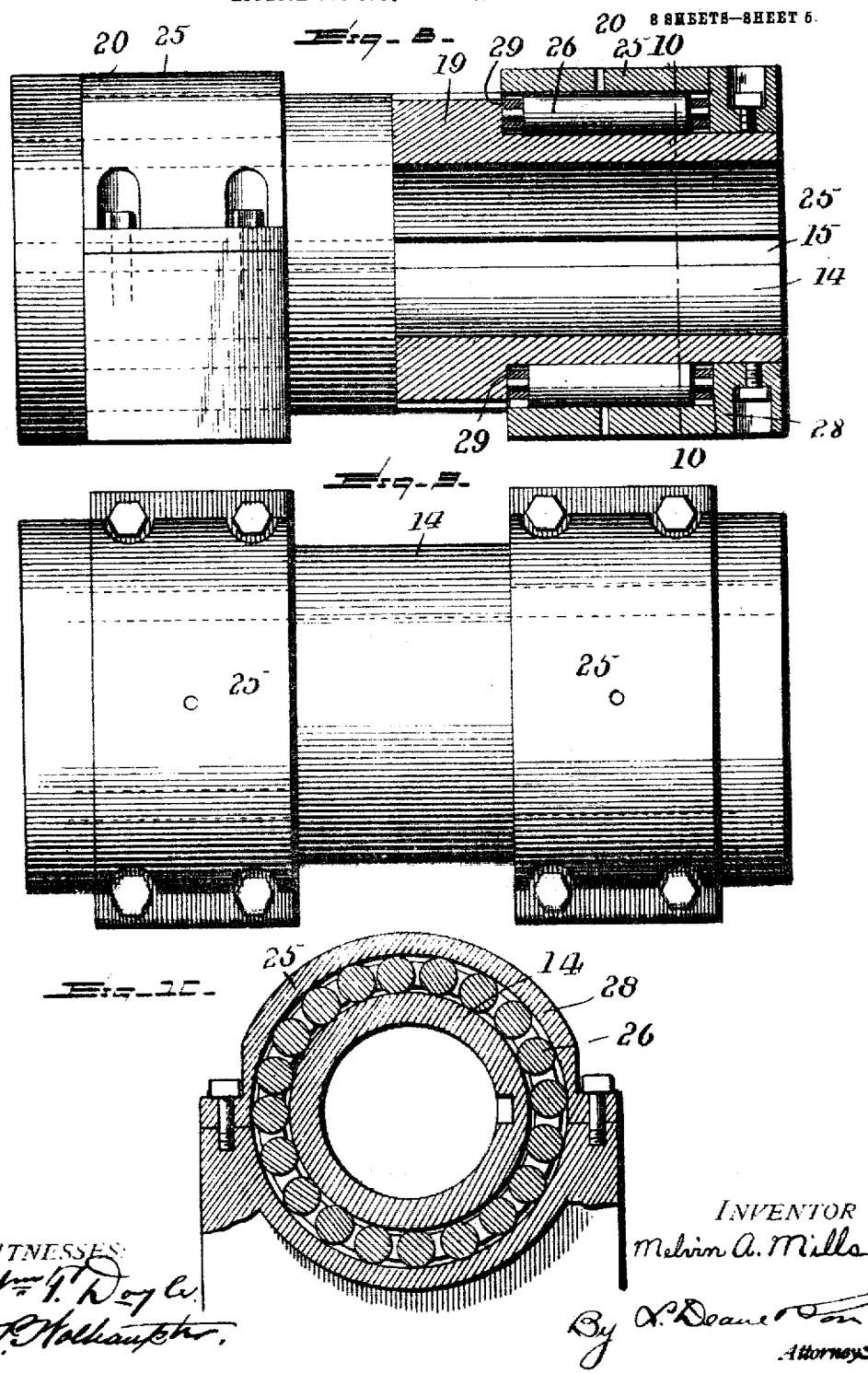

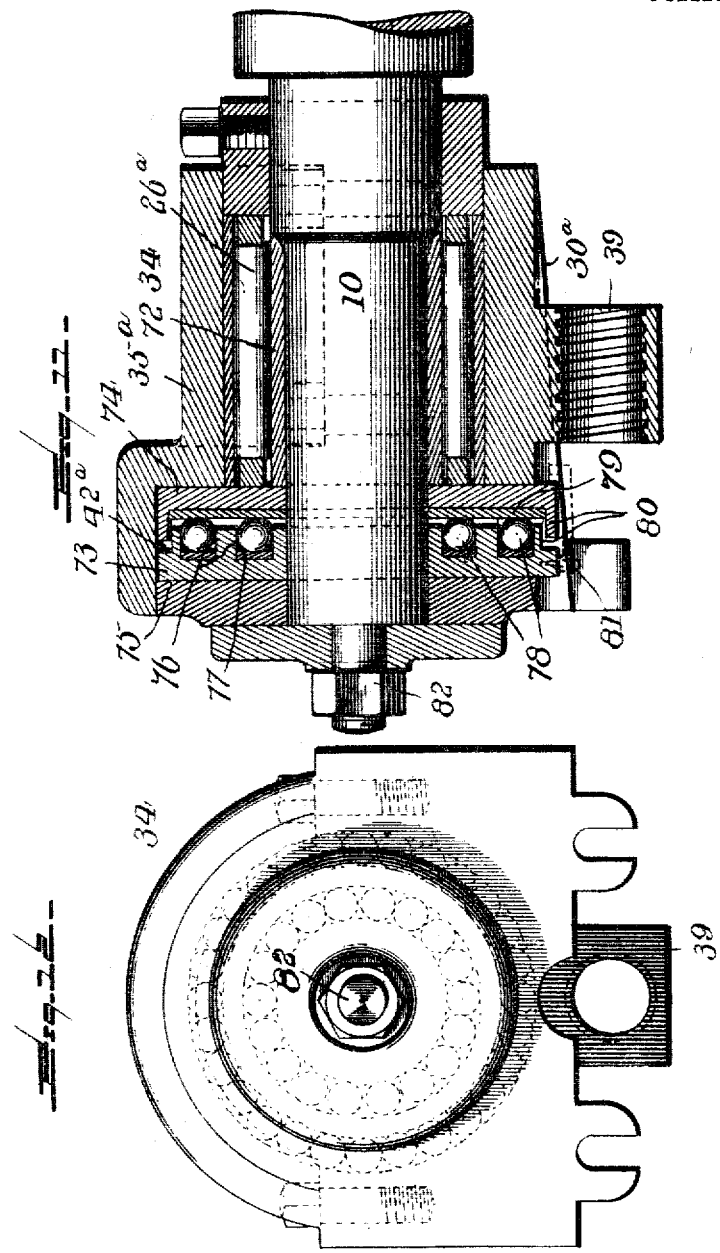

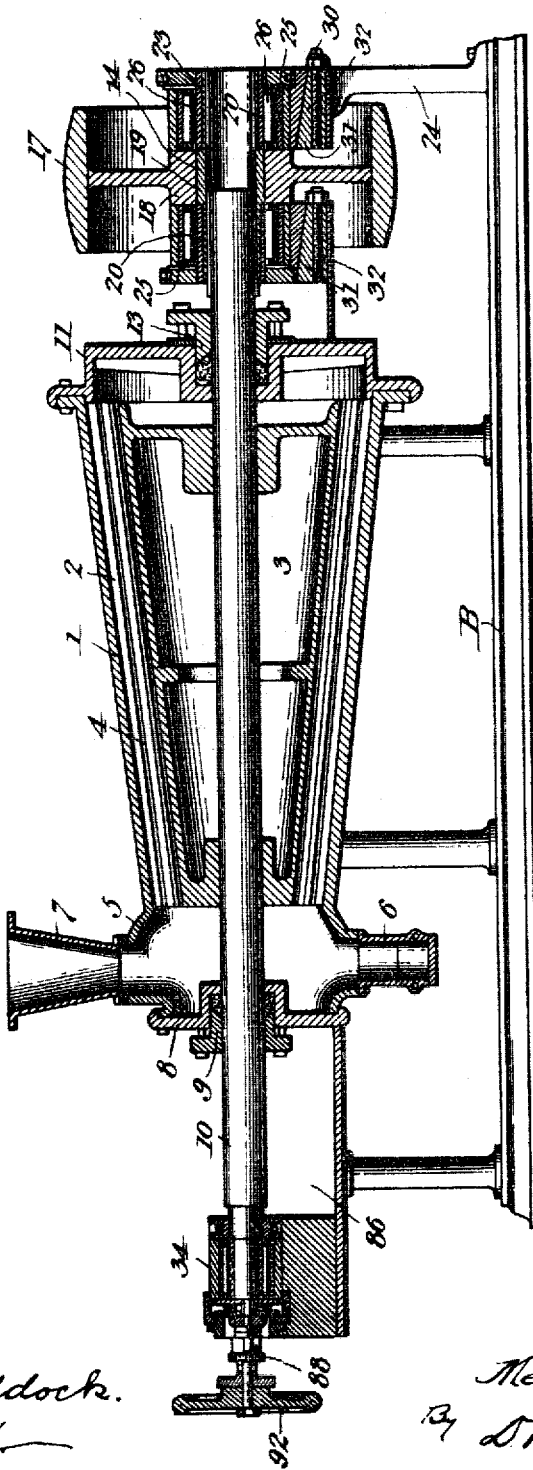

No. 818,039. PATENTED APR. 17, 1906.
M. A. MILLS.
REFINING ENGINE FOR PAPER PULP.
APPLICATION FILED APR. 23, 1901.
8 SHEETS—SHEET 8.
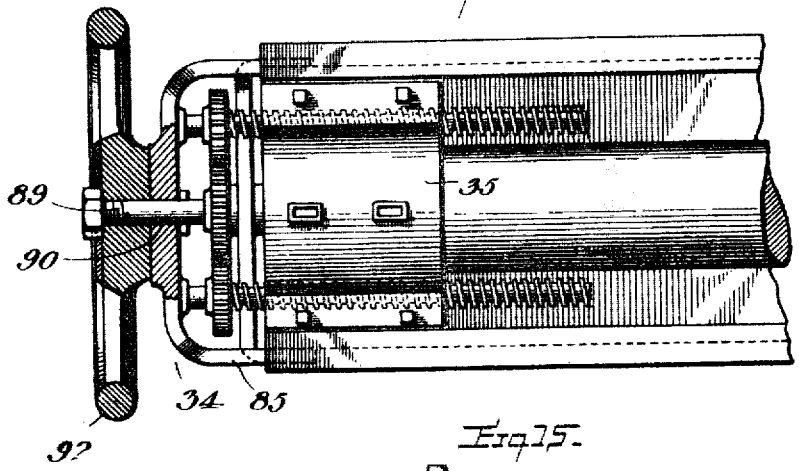
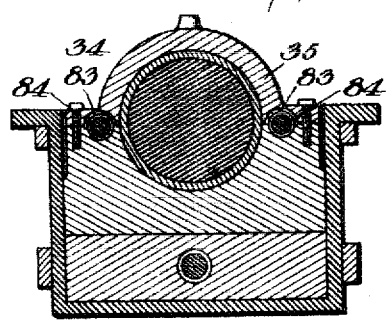
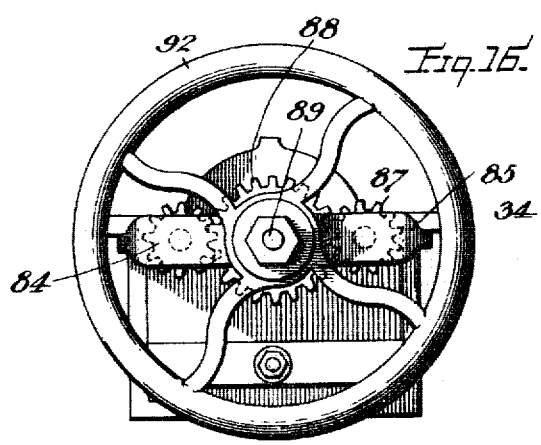
Witnesses:
R. C. Braddock
R. M. Smith
Inventor,
Melvin A. Mills,
By D. P. Wolhaupter
attorney

UNITED STATES PATENT OFFICE.

MELVIN A. MILLS, OF LAWRENCE, MASSACHUSETTS.

REFINING-ENGINE FOR PAPER-PULP.

No. 818,039.

Specification of Letters Patent.

Patented April 17, 1906.

Application filed April 23, 1901. Serial No. 67,080.

*To all whom it may concern:*

Be it known that I, MELVIN A. MILLS, a citizen of the United States, residing at Lawrence, in the county of Essex and State of Massachusetts, have invented certain new and useful Improvements in Refining-Engines for Paper-Pulp; and I do hereby declare the following to be a full, clear, and exact description of the invention, such as will enable others skilled in the art to which it appertains to make and use the same.

This invention relates to paper-making machinery, and has special reference to that type of refining machines or engines commonly known in the art, and especially among paper manufacturers, as "Jordan" engines, designed for grinding the pulp or paper stuff, while to the same time making provision for the elimination therefrom of such foreign substances as nails, pieces of metal, and the like which are sometimes carried with the pulp into the refining or grinding engine.

To this end the invention primarily contemplates certain new and useful improvements in that type of Jordan engines disclosed in and covered by my former patent, No. 581,605, dated April 27, 1897, said type of Jordan engine comprising in its general organization a tapering shell or case provided upon the interior thereof with a series of ledger knives or blades and a correspondingly-tapered Jordan plug or roll rotating inside of the shell and also carrying a plurality of exterior knives or blades coöperating with those of the shell to effect the necessary grinding or maceration of the paper-pulp.

In a more definite aspect the invention broadly contemplates a novel mounting and arrangement of parts whereby an adjustment of the Jordan plug or roll is permitted within the stationary inclosing shell or case to compensate for the wear incident to the grinding or macerating operation, without, however, shifting or otherwise disturbing the relatively fixed driving-gear for the plug-shaft.

A further object of the invention is to provide a novel arrangement of driving-gear for the plug-shaft to insure a minimum amount of friction in the running thereof, while at the same time permitting of the endwise movement or adjustment of the plug-shaft.

Another object in this connection is to so arrange the bearings of the driving-gear that all of the parts will be evenly balanced and will run smoothly and accurately.

The invention also contemplates an improved means for effecting the longitudinal adjustment of the shaft and the revolving plug carried thereby, and the invention also has in view the provision of a thrust-bearing associated with the adjusting mechanism or means for the shaft.

Another object is to provide a new and improved form of duplex thrust-bearing capable of minute adjustment during the running of the engine and comprising simple and effective means for taking the thrust of the shaft as the same may rotate in either direction.

With these and many other objects in view, which will more readily appear as the nature of the invention is better understood, the same consists in the novel construction, combination, and arrangement of parts hereinafter more fully described, illustrated, and claimed.

The essential features of the invention involved in the objects above specified are necessarily susceptible to a wide range of modification without departing from the spirit or scope of the invention; but for illustrative purposes there is shown in the accompanying drawings several practical embodiments of the invention.

Figure 2:
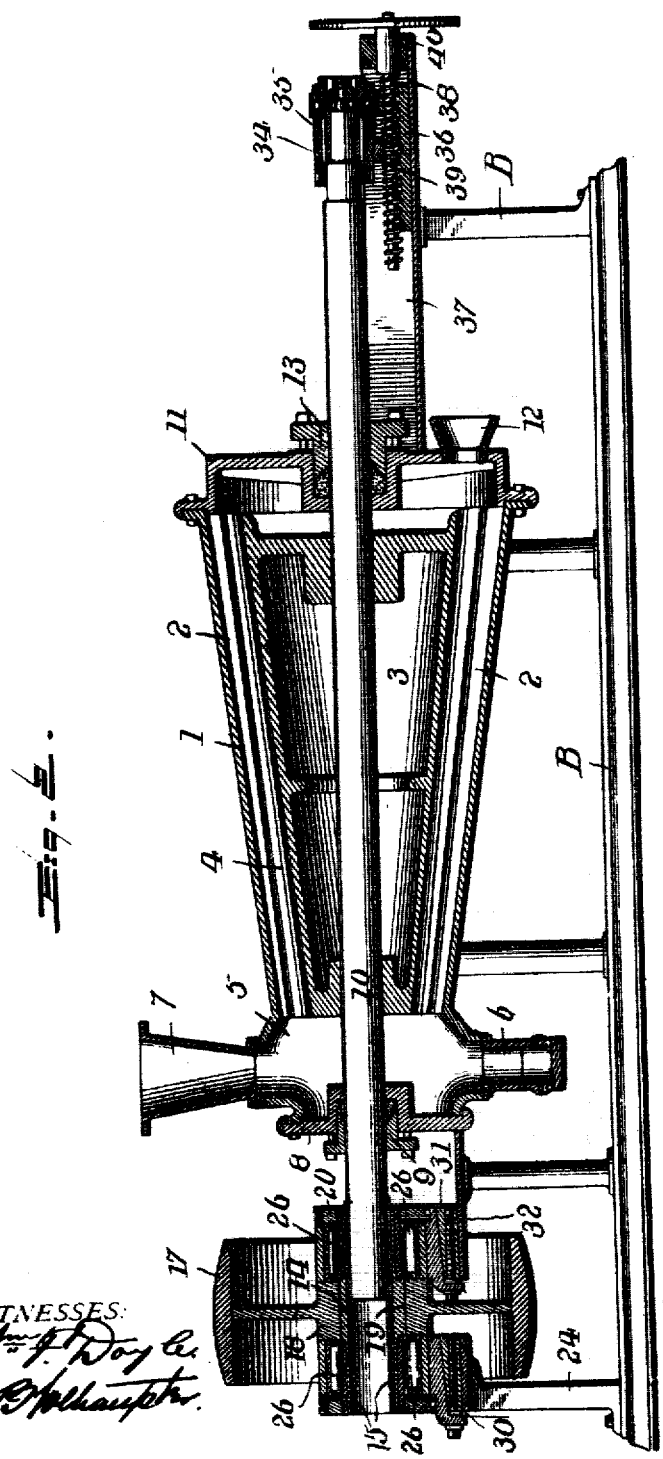

In the drawings, Figure 1 is a side elevation of a refining or Jordan engine embodying the improvements contemplated by the present invention. Fig. 2 is a vertical longitudinal sectional view of the entire engine. Fig. 3 is an enlarged sectional view of the preferred form of driving-gear, the view showing in dotted lines how a dynamo or other power-shaft may be directly coupled to the driving quill or sleeve to provide for the direct transmission of power thereto instead of through the medium of the pulley and belt. Fig. 4 is an enlarged detail sectional view of a preferred form of duplex or double-acting thrust-bearing utilized in connection with that end of the plug-shaft opposite the slidable coupling thereof with the quill or sleeve of the driving-gear. Fig. 5 is an enlarged detail sectional view of a portion of the roller-bearing and oppositely-arranged thrust plates or disks of the double-acting or duplex bearing device which constitutes the thrust-bearing for one end of the Jordan-plug shaft. Fig. 6 is an enlarged fragmentary elevation of a section of the roller-bearing which is interposed between said thrust plates or disks, the loose bearing-ring being omitted to expose the mounting of the radial rollers. Fig. 7 is a vertical longitudinal sectional view of the complete engine, showing an obvious modification of the present invention, including a simple form of single-acting thrust-bearing for one end of the Jordan-plug shaft and plain roller-bearings for the driving quill or sleeve having the power connection therewith. Fig. 8 is an enlarged sectional view in detail, showing one of the original forms of driving-gear employed in the development of the invention. Fig. 9 is a plan view of the bearings and the driving quill or sleeve supported thereby of the modification shown in Fig. 8, the view omitting other parts. Fig. 10 is a detail sectional view on the line 10 10 of Fig. 8. Fig. 11 is an enlarged detail sectional view of another modification of the adjustable thrust-bearing for the Jordan-plug shaft, said bearing employing original forms of the invention with reference to that part of the invention. Fig. 12 is an end view of the form of thrust-bearing disclosed in Fig. 11. Fig. 13 is a vertical longitudinal sectional view of another modification of the invention, disclosing a reverse arrangement from that shown in Figs. 2 and 7—that is, the location of the driving-gear at or contiguous to the discharging end of the engine and the thrust-bearing located beyond the opposite end. Fig. 14 is an enlarged plan view, partly in section, of a modification of the adjusting means for the thrust-bearing which is disclosed in connection with the construction shown in Fig. 13. Fig. 15 is a cross-sectional view on the line 15 15 of Fig. 14. Fig. 16 is an end view of the construction shown in Fig. 14.

Like numerals of reference designate corresponding parts in each of the views of the drawings.

As already explained, the improvements contemplated by the present invention are applicable particularly to the type of Jordan engine disclosed in my patent aforesaid, No. 581,605, and essentially comprising in its organization an exterior tapering shell 1, provided upon the interior thereof with a series of longitudinally-arranged knives or blades 2 and an interior correspondingly-tapered Jordan plug or roll 3, rotating inside of the shell and also carrying a plurality of longitudinally-arranged knives or blades 4, coöperating with those of the stationary shell to effect a grinding or maceration of the pulp as it passes through the machine. There is a working space provided between the exterior of the conical rotating plug and the inner wall of the inclosing shell 1, which space is practically occupied by the stationary knives or blades 2 of the shell and the rotating knives 4 working in proximity thereto, whereby the proper grinding or macerating action may be carried out in the manner peculiar to the Jordan engine. In the type of Jordan engine being described the inclosing shell 1 thereof is shown as provided with an annular chamber 5 at the feed or receiving end thereof, said annular chamber being either an integral part of the shell or separately attached thereto, but in either event providing an annular enlargement for the receiving end of the shell, which forms a refuse chamber or trap for the collection and disposal of such substances as nails and the like that frequently flow into the engine and are liable to injure the knives on the plug or its inclosing shell. The said chamber or trap 5 obviates this, and the same is preferably provided with a suitably-covered discharge-pocket 6, from which the foreign substances may be readily removed. The said chamber or trap 5 is also designed to have connected therewith the usual inlet or inlets 7 for the paper-pulp or stuff to be treated within the engine.

The integral or conical inclosing shell 1 is preferably closed at the receiving end thereof by a head-plate or cap 8, fitted with a stuffing-box 9 for the horizontally-arranged rotating plug-shaft 10, extending longitudinally through the shell and having the Jordan plug or roll rigidly mounted thereon so as to rotate therewith. At the end opposite the closing-head 8 the shell 1 has bolted or otherwise suitably fitted thereto an offset chambered head 11, which is offset from the base or wide end of the shell beyond the correspondingly wide end of the plug to constitute a discharge or delivery chamber which receives the ground or macerated paper stuff and permits of the ready discharge thereof through the outlet-pipe 12 in communication with the interior chamber of the head 11. The said head 11 is also equipped with a stuffing-box 13, which is in precise alinement with the oppositely-located box 9 to provide for an accurate centering of the shaft 10.

The construction so far described is in all essential respects substantially the same as that covered or comprehended by my former patent, No. 581,605, and inasmuch as the present invention has special reference to the driving-gear for the plug-shaft, as well as to the means for the endwise adjustment thereof in connection with its thrust-bearing, these parts of the invention will now be particularly referred to. First, with reference to the driving-gear for the plug-shaft it is understood that an essential feature thereof resides in the construction and arrangement of parts whereby the plug-shaft may be positively driven at all times and the longitudinal or endwise adjustment thereof permitted without disturbing the relatively fixed position of any part of the driving-gear. Various forms of driving-gear may obviously be employed for effecting this necessary result, but a few practical embodiments of this part of the invention are shown in the drawings. In all of these different embodiments there is preserved one element—namely, that of a non-shiftable rotary driving quill or sleeve 14, having the power connection therewith and having slidably coupled or feathered therein one end of the plug-shaft 10, preferably that end projecting beyond the feed or receiving end of the shell 1 of the engine. The slidable interlocking connection of the plug-shaft 10 with the rotating or driving quill or sleeve 14 may be effected by any of the well-known mechanical expedients, it only being necessary that the plug-shaft be so coupled with the driving-quill as to positively rotate therewith, while at the same time being free to slide within the quill to admit of the longitudinal movement or adjustment of the plug-shaft and the Jordan plug carried thereby. A simple form of coupling or feathered connection is shown on the drawings and consists in providing the quill or sleeve 14 upon the inner side thereof with longitudinally-arranged keyways 15, which are slidably engaged by the longitudinally-disposed keys or feathers 16, provided upon the plug-shaft 10, said construction necessarily providing for the rotation of the plug-shaft with the quill or sleeve and the endwise movement or adjustment of the shaft therein without disturbing the relative position of the quill or sleeve.

The quill or sleeve 14 constitutes the driving element for directly transferring motion to the shaft 10 of the Jordan plug, and, as already indicated, any suitable power connection may be provided for rotating the quill or sleeve. In the preferred embodiments of the invention this is accomplished by mounting a driving-pulley 17 centrally upon the quill or sleeve 14, the hub 18 of said pulley being made fast upon the central thickened collar portion 19 of the quill and extending entirely across the interval between the oppositely-located bearings 20, disposed upon opposite sides of the driving-pulley and constituting bearing-supports for the journal ends of the driving-quill. By reason of the hub of the pulley extending across the interval between the oppositely-located bearings 20 the driving-quill is held to rotation in a fixed plane and is prevented from longitudinal movement, although the other parts of the driving-gear are so constructed as to cooperate in securing these results. Though the driving-pulley 17 is the preferred means for communicating motion to the quill, it will of course be understood that other means may be employed—such, for instance, as the employment of a power-shaft 21, having keys 22, which may be engaged with the interior keyways of the driving-quill within the end portion opposite the end of the quill receiving the Jordan-plug shaft, said power-shaft being driven in any suitable manner, but when used in this way preferably being the shaft of an electric motor or dynamo, thus providing for the direct coupling of electric power with the Jordan engine should it be desired to drive the same in that way. This suggested modification in power connection is indicated in dotted lines in Fig. 3 of the drawings.

Although in its preferred construction the quill 14 is provided with a central reinforcing-collar portion 19, the same may obviously be made plain throughout, as shown in the modified construction of Fig. 7 of the drawings; but in all forms of the invention the driving-quill 14 is provided at opposite sides of the central portion, usually adapted for the mounting of the pulley thereon, with the journal ends 23, which turn within the oppositely-located bearings 20. These bearings for the opposite end portions or journals of the drive-quill are preferably of the antifriction type to insure an easy running of the quill and are carried at the upper ends of the bearing-standards 24, arising from the base B of the engine. In the practical construction of the machine or engine the bearings as an entirety essentially consist of the bearing-boxes 25, provided at the upper ends of the standards 24, and roller-bearings 26, housed within said boxes 25 about the journal ends 23 of the quill. This construction is shown in a simple form in Fig. 7 of the drawings in connection with a driving-quill of uniform dimensions throughout, although various modifications may be resorted to to provide for properly housing the roller-bearings and retaining the journal ends of the quill within the same. In an improved form of the engine embodying the construction of quill shown in Fig. 3 of the drawings there may be employed a wear or contact bushing 27, sleeved upon the journal ends 23 of the quill and having the roller-bearings 26 encircling the same and bearing directly thereon, said roller-bearings being retained in position preferably through the medium of retaining-collars 28, suitably held upon the extremities of the journal portions 23 of the quill.

An original form of the quill and its mounting in connection with the roller-bearings is shown in Fig. 8 of the drawings, but is of substantially the same construction as already described, with the exception of the central reinforcing-collar 19, having pronounced angular shoulders 29, which, in connection with the terminal retaining-collars 28, serve to properly confine the roller-bearings within the boxes 25. In said Fig. 8 of the drawings there is also shown associated with the bearing-boxes 25 adjusting or take-up devices 30, essentially comprising slidably-mounted wedges 31 and adjusting-screws 32 therefor to provide for the vertical adjustment of the bearing-boxes to insure the proper truing up of the Jordan-plug shaft, this expedient being disclosed in my former patent, No. 581,605, aforesaid.

To effect a delicate and minute endwise movement or adjustment of the shaft and the Jordan plug carried thereby, as well as to absorb the thrust of the shaft during the operation of the engine, there is employed in all forms of the invention an adjustable thrust-bearing 34, which receives the end of the shaft opposite its slidable connection with the driving-quill and is located beyond and contiguous to the wide or discharging end of the engine, although the arrangement described may be reversed without departing from the spirit of the invention. Broadly speaking, the thrust-bearing 34 is provided therein with suitable bearing devices, preferably of the antifriction type, to take the thrust of the shaft and is adjusted, as occasion may require, through the medium of suitable adjusting mechanism. In all of the practical forms of the invention the thrust-bearing referred to includes a bearing box or shell 35, having a slide or slides 36 working in guides 37 of a stationary guiding-support 38, arranged above the base B beyond one end of the engine. The said adjustable or slidable bearing-box 35 is also provided with one or more projecting nuts 39, receiving a suitably-operated adjusting-screw 40, which when manipulated provides for moving the entire thrust-bearing 34 in a direction to effect the endwise or longitudinal adjustment of the Jordan-plug shaft. Various modifications of the guiding-support and the adjusting means for the bearing box or shell 35 of the thrust-bearing may be resorted to, as shown in the different views of the drawings, and in addition to the features described the slidable box 35 may also be vertically movable and have associated therewith an adjusting or take-up device 30ª, (see Fig. 4,) similar to the device 30 already described and utilized for truing the parts, as suggested in my former patent.

In the simple and original forms of the thrust-bearing illustrated in Figs. 7 and 11 of the drawings the bearing devices within the box or shell 35 only provided for taking the thrust of the Jordan-plug shaft in one direction, and these forms of the invention will be hereinafter again referred to; but the more recent and more practical constructions from the standpoint of efficiency involve the provision of what might be properly termed a "duplex thrust-bearing" or one capable of allowing a movement and activity of the different parts of the bearing in either direction as the shaft may rotate in either direction and also providing for easing up the thrust of the shaft as pressure may be exerted in either longitudinal direction thereon during the running of the engine in one direction. This form of thrust-bearing in its improved aspect is shown in detail in Fig. 4 of the drawings.

Referring particularly to the construction of duplex bearing as shown in Fig. 4 of the drawings, it will be observed that the bearing box or shell 35 is provided within one end thereof with an enlarged annular counterbored portion 42, constituting an annular bearing-chamber for the reception and working therein of the double-acting or duplex bearing device 43, which constitutes the thrust-bearing proper. The annular counterbored portion 42 necessarily forms at the side edges thereof the inner and outer annular abutment-shoulders 44 and 45, respectively, with which cooperate the oppositely-disposed parallel thrust plates or disks 46 and 47, constituting a part of the device 43 and having interposed therebetween a roller-bearing 48. The said spaced parallel thrust plates or disks 46 and 47 are snugly but loosely fitted upon a shaft sleeve or bushing 49, which is secured upon a reduced portion 50 at one end of the reduced journal 51, formed at the end of the Jordan-plug shaft arranged within the adjustable terminal bearing 34 therefor. Immediately beyond the reduced portion 50, upon which is sustained the thrust-bearing proper, the Jordan-plug shaft is provided with the bolt-stud terminal 53, receiving thereon the nuts 54, holding in place a collar 55 and a fiber or equivalent washer 56, interposed between said collar and the shoulder at the base of the stud 53, said parts constituting a fastening means for securing the thrust-bearing as an entirety properly in place upon the reduced portion 50 of the shaft. The roller-bearing 48 of the bearing device includes a supporting-collar 57, fitted upon the shaft sleeve or bushing 49 and carrying a circular series of radially-extending antifriction tapering rollers 58, whose outer spindle extremities are journaled in the outer bearing-collar 59 and which rollers are retained in proper working position centrally between the side edges of the inner and outer collars 57 and 59 by a retaining-band 60, encircling the outer collar 59. In the interval between the collars 57 and 59, what might be properly termed the "bearing-frame" for the rollers 58, and upon opposite sides of said rollers, are arranged the loose bearing-rings 61, having inner beveled faces 62, conforming to the taper of the rollers 58, and having their outer sides projecting slightly beyond the side edges of the bearing-frame, so as to engage with and fit the channels 63 in the opposing faces of the oppositely-located thrust plates or disks 46 and 47.

In the improved form of bearing described it is preferable to associate therewith an adjusting device for taking up wear or delicately setting the parts of the thrust-bearing during the operation of the engine. A simple means for accomplishing this consists in the employment of a tubular exteriorly-threaded adjusting-nut 64, working in the threaded opening 65 at one end of the box or shell 35 and adapted to bear at its inner end against the outer plate or disk 47, said adjusting-nut 64 being held perfectly fast after adjustment through the medium of a check or lock nut 66, arranged on the exterior thereof and working against the adjacent end of the box or shell 35.

It will be obvious from the construction described that according to the direction of thrust of the Jordan-plug shaft the plates 46 and 47 will become alternately fast and loose, and thus permit of a perfectly free action of the thrust-bearing and the easing up of the thrust.

In connection with the thrust-bearing proper, termed the "duplex-bearing" device, 43, a roller-bearing 67 is preferably housed within the shell or box 35 about the journal portion 51 of the shaft, and to assist in holding the journal of the shaft properly centered within the bearing-box 35 and also to assist in holding the roller-bearing 67 in place there is preferably fitted upon the shaft a shaft-collar 68, having a flange 69 extending into one end of the box or shell 35.

The simple and original form of thrust-bearing disclosed in Fig. 7 essentially involves a thrust plate or disk 70, carried by the shaft 10 and disposed at one side of a roller-bearing 71 of a substantially similar construction to the roller-bearing 48 previously described, but which coöperates only with a single thrust plate or disk 70, and hence provides means simply for taking the thrust of the Jordan-plug shaft in one direction. Another original form of thrust-bearing which only provides for taking the thrust of the plug-shaft in one direction is illustrated in Figs. 11 and 12 of the drawings. In this form of the invention there is combined with the bearing which takes the thrust of the shaft a roller-bearing 26ª, encircling the terminal of the shaft extending into the bearing-box 35ª, said roller-bearing being arranged to coöperate with a sleeve or bushing 72, made fast upon the shaft 10 and constituting a shoulder at one end, against which abuts the inner one of a pair of loose thrust disks or plates 73 and 74, respectively. These loose thrust disks or plates 73 and 74 are disposed within the enlarged annular counterbored portion 42ª of the bearing-box 35ª, which counterbored portion constitutes an annular bearing-chamber for the thrust-bearing proper, and the outer one, 73, of the said thrust disks or plates is designed to bear against the abutment-head 75, arranged at the outer end of the bearing-box 35ª and constituting either an integral or separate part thereof. The said plate or disk is also provided at the inner side thereof with a plurality of concentric ball-races 76, having wear-plates 77 in their bases and accommodating therein a plurality of antifriction bearing-balls 78, which also project outside of the plane of the races 76 and contact with the wear-plate 79 at one side of the inner thrust plate or disk 74. Of course this construction may be reversed without departing from the spirit of the invention; but in either aspect thereof the outer thrust-plate 73 becomes fast against the abutment head or shoulder 75 when the thrust of the shaft is imposed thereon, thus leaving the other thrust plate or disk free to be carried about with the shaft against the antifriction bearing-balls. At their peripheral edges the thrust plates or disks 73 and 74 are preferably provided with loosely-overlapping flanges 80, and said plates may also be loosely coupled together by a coupling device 81, such as indicated in dotted lines, and which, while preventing undue separation of the plates, at the same time admits of the action above described. A fastening device 82 at the extreme tip of the shaft 10 serves to hold the parts of the bearing properly assembled within the bearing box or shell 35ª.

In the embodiment of the invention suggested in Fig. 13 of the drawings the driving-gear is arranged in close proximity to the discharging end of the shell 1, and thus places the power in closer relation to the plug to be driven than is possible by the reverse arrangement already described. In this modification the thrust-bearing 34 is necessarily located beyond the feeding end of the engine, and in connection with this arrangement of the thrust-bearing there is illustrated a modified form of adjusting means which may be associated therewith to effect the longitudinal or endwise adjustment of the shaft. The suggested modification of the adjusting means or mechanism involves the provision of the bearing-box 35 at opposite sides thereof with the threaded openings 83 receiving therein the oppositely-located adjusting-screws 84, journaled at their outer ends in a bearing-bracket 85, offset from one end of the bearing-stand 86 and carrying thereon the pinions 87. These pinions mesh with a common operating-gear 88, mounted on the inner end portion of a short operating-shaft 89. This operating-shaft is also journaled in a bearing 90 of the bracket 85 and carries a hand-wheel 92 for the operator. The construction of the adjusting mechanism described provides a very positive and reliable means for effecting a uniform and even adjustment of the thrust-bearing.

In carrying out the invention various other modifications and changes in the form, proportion, and minor details of construction may be resorted to without departing from the spirit or sacrificing any of the advantages of the invention.

Having thus described the invention, what is claimed as new, and desired to be secured by Letters Patent, is—

1. A refining-engine comprising a shell, a plug in said shell, a shaft rigidly attached to said plug, a driving-pulley having its axis in alinement with the shaft, independent fixed bearings for the pulley arranged concentrically to the shaft, the pulley being journaled in said bearings, said shaft being arranged slidably within the pulley but held to turn therewith, and means for adjusting the shaft longitudinally, substantially as set forth.

2. A refining-engine comprising a shell, a plug in said shell, a shaft rigidly attached to said plug, a driving-pulley having its axis in alinement with said shaft, two independent fixed bearings for the pulley, one arranged on each side of the same concentrically to the shaft, the pulley being journaled in said bearings, means for connecting the shaft to the pulley for a rotation therewith but free longitudinal movement within the same, and means for adjusting said shaft longitudinally, substantially as described.

3. A refining-engine comprising a shell, a plug in said shell, a shaft rigidly attached to said plug, a driving-pulley having its axis in alinement with said shaft, two independent fixed bearings for the pulley, one arranged on each side of the same concentrically to the shaft, a sleeve rigidly connected to the pulley and having its ends extended on each side of the same and turning in the fixed bearings, the said shaft being extended into said sleeve and connected to it for positive rotation but longitudinally adjustable within the same, and means for imparting an endwise adjustment to the shaft, substantially as described.

4. A refining-engine comprising a shell, a plug in said shell, a shaft rigidly attached to said plug, a driving-pulley having its axis in alinement with said shaft, two independent fixed supports for said pulley provided with roller-bearings, one of said supports being arranged on each side of the pulley, a sleeve rigidly connected to the pulley and having its ends extended on each side of the same and turning in said roller-bearings, the said shaft being extended into said sleeve and connected to it for positive rotation, but longitudinally adjustable within the same, and means for imparting an endwise adjustment to the shaft, substantially as described.

5. In an engine substantially as described, the combination of a shell, a shaft passing through the shell and having a plug rigidly attached to the shaft and rotatable within the shell, a pulley for driving the shaft arranged concentrically thereto, and a fixed bearing supporting the pulley and receiving the lateral pull and strain of its belt independently of the shaft, said shaft being extended concentrically within the pulley and connected to it for a positive rotation but free longitudinal adjustment, substantially as described.

6. A refining-engine comprising a bed-plate having fixed bearings and a thrust-bearing, a shell on said bed-plate, a plug in said shell, a shaft for said plug, and having one end mounted in said thrust-bearing, and a pulley having a sleeve extending beyond each side thereof and mounted in the fixed bearings, the said sleeve having the other end of the shaft slidably inserted therein, but held to turn therewith, as set forth.

7. In an engine of the class described, the combination with the shell and the rotating plug therein, of the plug-shaft, driving-gear having an operative connection with said shaft for turning the same while permitting a longitudinal movement thereof, and adjusting means for effecting endwise movement of the shaft.

8. In an engine of the class described, the combination with the shell and the rotating plug therein, of the plug-shaft, driving-gear fixedly arranged and having an operative conection with one end of said shaft, a thrust-bearing for the opposite end of the shaft, and shaft-adjusting means associated with said thrust-bearing.

9. In an engine of the class described, the combination with the shell and the rotating plug therein, of the plug-shaft projecting beyond opposite ends of the shell, driving-gear arranged beyond one end of the shell and having a rotating quill slidably receiving one end of the plug-shaft, and also interlocked therewith, a thrust-bearing receiving the opposite end of said shaft, and adjusting means associated with said thrust-bearing for effecting endwise adjustment of the shaft and the plug carried thereby.

10. In an engine of the class described, the combination with the shell and the rotating plug therein, of the plug-shaft, a suitably-rotated driving-quill having bearing-supports at both ends, said quill slidably receiving one end of the shaft and also interlocked therewith, a thrust-bearing receiving the opposite end of said shaft, and adjusting means associated with said thrust-bearing for effecting endwise adjustment of the shaft.

11. In an engine of the class described, the combination with the shell and the rotating plug therein, of the plug-shaft, axially-alined spaced roller-bearings, a driving quill or sleeve having journal ends turning in said roller-bearings, said quill slidably receiving one end of the plug-shaft and interlocked therewith, a pulley fitted centrally upon the quill between said bearings, and adjusting means coöperating with said shaft to effect an endwise adjustment thereof and the plug carried thereby.

12. In an engine of the class described, the combination with the shell and the plug, of the plug-shaft, a driving-gear operatively connected with one end of the shaft, a stationary guiding-support, a thrust-bearing slidably mounted upon said support and receiving the end of the shaft opposite the driving-gear, and adjusting mechanism for sliding the thrust-bearing upon its support.

13. In an engine of the class described, the combination with the shell and the plug having a shaft projecting exterior to the shell, driving-gear for the shaft, and a thrust-bearing receiving the shaft and comprising means for bearing the thrust of the shaft in either direction.

14. In an engine of the class described, the combination with the shell, and the plug having a shaft, of driving-gear for the shaft, and a duplex or double-acting thrust-bearing receiving the shaft.

15. In an engine of the class described, the combination with the shell, the plug, and the driving-gear for the plug-shaft, of a duplex or double-acting thrust bearing, comprising means for similarly bearing the thrust of the shaft in either direction.

16. In an engine of the class described, the combination with the shell, the plug, and the driving-gear for the plug-shaft, of the duplex or double-acting thrust-bearing comprising means for similarly bearing the thrust of the shaft in either direction, and adjusting mechanism for longitudinally adjusting the thrust-bearing to effect an endwise adjustment of the shaft.

In testimony whereof I affix my signature in presence of two witnesses.

MELVIN A. MILLS.

Witnesses:
HENRY E. COOPER,
E. M. SHUSTER.